United States Patent [19]

Higuchi

[11] 4,432,027
[45] Feb. 14, 1984

[54] MAGNETIC HEAD

[75] Inventor: Tetsuo Higuchi, Saitama, Japan

[73] Assignees: Canon Kabushiki Kaisha, Tokyo; Canon Denshi Kabushiki Kaisha, Saitama, both of Japan

[21] Appl. No.: 280,097

[22] Filed: Jul. 2, 1981

[30] Foreign Application Priority Data

Jul. 11, 1980 [JP] Japan .............................. 55-97865[U]

[51] Int. Cl.³ .......................... G11B 5/48; G11B 21/16; G11B 5/54; G11B 21/22
[52] U.S. Cl. ....................................... 360/104; 360/99; 360/105
[58] Field of Search ................. 360/104, 99, 119, 122, 360/125, 128, 105

[56] References Cited

U.S. PATENT DOCUMENTS

| 3,975,771 | 8/1976 | Lazzari | 360/104 |
| 4,141,050 | 2/1979 | Wiseley | 360/104 |
| 4,293,883 | 10/1981 | Cox | 360/104 |
| 4,315,292 | 2/1982 | Kronfeld | 360/104 |
| 4,327,388 | 4/1982 | Wanek | 360/104 |
| 4,343,025 | 8/1982 | Kronfeld | 360/105 |
| 4,347,535 | 8/1982 | Dalziel | 360/99 |

Primary Examiner—Robert M. Kilgore
Attorney, Agent, or Firm—Fitzpatrick, Cella, Harper & Scinto

[57] ABSTRACT

A magnetic head includes a core securely mounted on core support or coil connector. The coil connector is provided at one end with a hole in which the core is fitted for preventing the separation of the connector. An end of an insulating member is inserted between the coil and support for preventing short-circuiting of the coil by contact with the support.

6 Claims, 5 Drawing Figures

MAGNETIC HEAD

BACKGROUND OF THE INVENTION

1. Field of the Invention

The present invention relates to a magnetic head in which a connector for coil connection is securely mounted on a core.

2. Description of the Prior Art

FIGS. 1 through 3 illustrate one known magnet head apparatus for recording on and reading out information from a floppy disk. As shown there, a magnetic head apparatus or, floppy disk device, such as is widely used as an external memory for a computer, includes a dougnut-shaped rotating magnetic disk contacted by a magnetic head for information recording and readout. FIG. 1 shows, in a schematic perspective view, the position of magnetic heads for information recording and readout on both faces of a floppy disk, wherein the disk 1, a protective jacket for which is omitted in the illustration for the purpose of clarity, is rotated in a direction of arrow A by drive means (not shown) to be fitted in an aperture 2. The lower face of the disk 1 is contacted by a gap 4 of a magnetic head 3 to define a track 7, while the upper face of said disk 1 is contacted by a magnetic head 6 supported by an arm 5 biased in a direction of arrow B to define a track 8, the tracks 7 and 8 are not in opposed position but are separated from each other by four track pitches.

FIG. 2 is a view, seen from the direction of arrow C in FIG. 1, of the disk 1 contacted by the magnetic heads 3 and 6, illustration of the arm 5 being omitted.

The magnetic head 6 is supported by an elastic plate 9 of a copper alloy mounted on the arm shown in FIG. 1, whereby the magnetic head 6 is supported by the arm 5 through said elastic plate 9. Under the elastic plate 9, front core members 10a, 11a and a spacer 12a are sandwiched between assembly members 13, 14. The lower face of the assembly member 14 positioned to the right of a recess 14a thereof is positioned in facing relationship to the gap 4 of the magnetic head 3 and presses the disk 1 downward to form the track 7 on the lower face thereof. Also a part of the magnetic head 3 is positioned in facing relationship to the magnetic gap of the magnetic head 6 and presses the disk 1 upward to form the track 8 on the upper face thereof. Above the elastic plate 9 there is provided a coil 15 wound on the front core members and soldered at the ends thereof to connecting portions 17a on a flexible printed circuit board 16. FIG. 3 shows, in a perspective view, the connection of the elastic plate 9 and the flexible printed circuit board 16 to the magnetic head 6, wherein the circuit board 16 having copper-plated circuit patterns 17 is adhered by an epoxy adhesive to the elastic plate 9 in a hatched adhesion area 16a, and the lead wires of the coil 15 are soldered to the connecting portions 17a as shown in FIG. 2. In such known structure, however, the flexible printed circuit board 16 may become peeled off from the elastic plate 9, and eventually insufficient insulation of the coil 15 may cause short-circuiting thereof through the conductive elastic plate 9.

SUMMARY OF THE INVENTION

A first object of the present invention is to provide a magnetic head in which connecting means for coil connections are securely mounted to the core.

A second object of the present invention is to provide a magnetic head capable of preventing peeling of a part of the connecting means from core support means.

A third object of the present invention is to provide a magnetic head capable of preventing short circuiting of the coil by contact thereof with support means.

DETAILED DESCRIPTION OF THE PREFERRED EMBODIMENTS

Now the present invention will be explained in detail by the following description to be taken in conjunction with the attached drawings.

Figure 1:
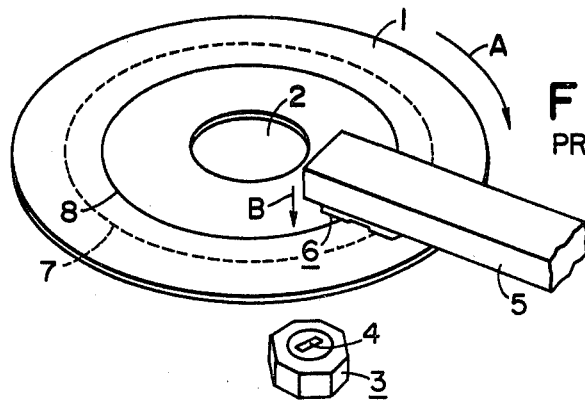
FIG. 1 is a perspective view showing the position of a disk and magnetic heads in the prior art device described above.
Figure 2:
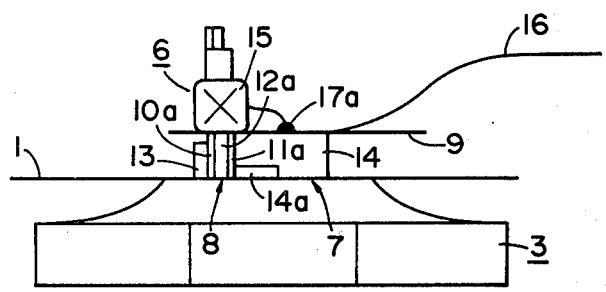
FIG. 2 is a lateral view showing the position of the disk and magnetic heads in the prior art device.
Figure 3:
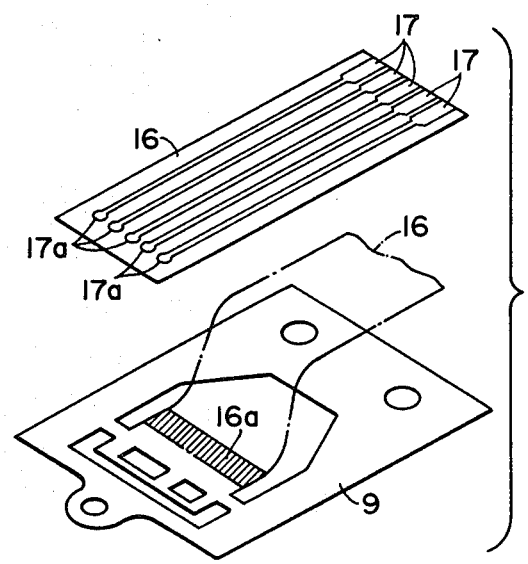
FIG. 3 is a perspective view showing an elastic plate and a flexible printed circuit board employed in a conventional magnetic head.
Figure 4:
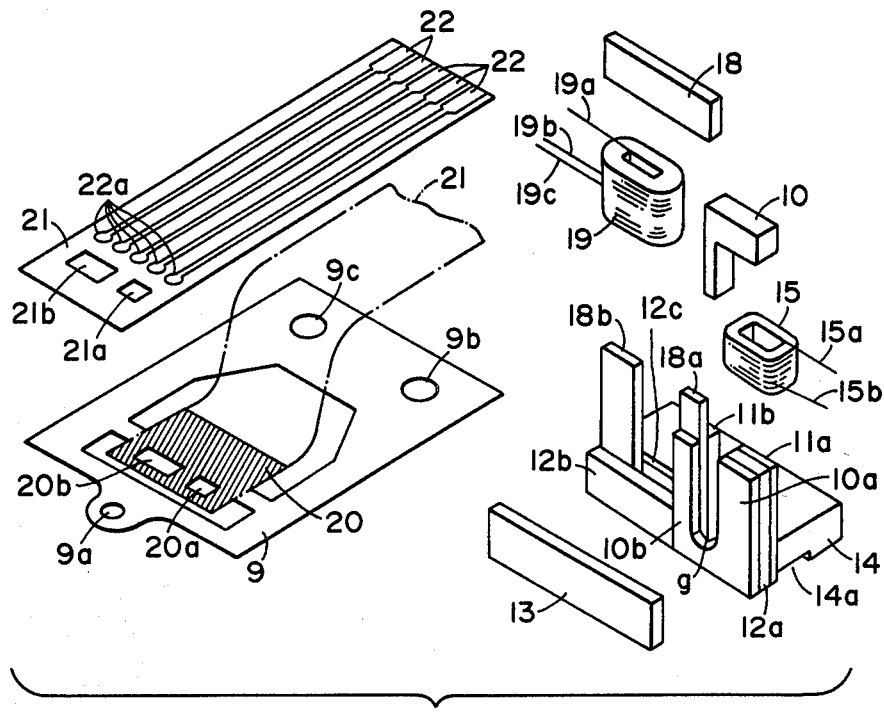
FIG. 4 is a perspective view showing the components employed in the magnetic head of the present invention.

FIG. 4 shows, in a perspective view, the components to be employed in the magnetic head of the present invention, wherein an elastic plate 9, made of a copper alloy (Be-Cu) or a stainless steel of a thickness of about 50μ, is provided with mounting holes 9a, 9b and 9c for mounting it on an arm 5 such as is shown in FIG. 1 and with a core support area 20 for supporting the core, in which apertures 20a, 20b are provided for engaging with the core. An electrically highly insulating flexible printed circuit board 21 composed of polyimide of a thickness of about 50μ is provided on the surface thereof with copper-plated circuit patterns 22 having connecting portions 22a and further with apertures 21a, 21b respectively corresponding to the above-mentioned apertures 20a, 20b in the core support area 20 of the elastic plate. The flexible printed circuit board 21 is adhered with an epoxy adhesive to the core support area 20 indicated by hatching on the elastic plate 9, in such a manner that the apertures 20a, 20b respectively coincide with the apertures 21a, 21b. Substantially L-shaped front core halves 10a and 10b of a material of a high magnetic permeability such as a ferrite are positioned in abutting relation to form a gap g at the bottom part thereof, and front core halves 11a, 11b are similarly positioned to form a gap also in the bottom part thereof. The front core halves 10a and 11a support a ceramic spacer 12a therebetween, while front core halves 10b, 11b support a substantially L-shaped ferrite front core half 18a therebetween. The above-mentioned gaps formed by the front core halves 10a, 10b, 11a and 11b generate erasing magnetic fields.

Also substantially L-shaped ferrite front core halves 18a, 18b are positioned in mutually facing relationship, in a similar manner as the core halves 10a and 10b, to form a gap (not shown) for information recording and readout at the bottom part, and ferrite spacers 12b, 12c are provided to support therebetween the lower part of said front core halves 18a and 18b. A ceramic assembly member 13 is provided in contact with the lower part of the front core halves 10a, 10b and the spacer 12b, and another ceramic assembly member 14 is provided in contact with the lower part of the front core halves 11a, 11b and the spacer 12c. The front core halves 10a, 11a and the spacer 12a are fitted into the aperture 20a (and 21a) provided in the core support area 20 of the elastic plate 9 and in the printed circuit board respectively, and the front core halves 10b, 11b, 18a and 18b are fitted into the aperture 20b (and 21b). A coil 15 for generating the erasing magnetic field is fitted on the front core halves 10a, 11a and the spacer 12a, and a substantially L-shaped ferrite back core 10 is mounted in contact with the top face of these core halves. Also a write-read coil 19 is fitted on the front core half 18b and a substantially rod-shaped ferrite back core 18 is mounted in contact with the upper lateral face of the front core halves 18a and 18b. The coil lead wires 15a, 15b, 19a–19c are respectively soldered to respective connecting portions 22a of the flexible printed circuit 21.

Figure 5:
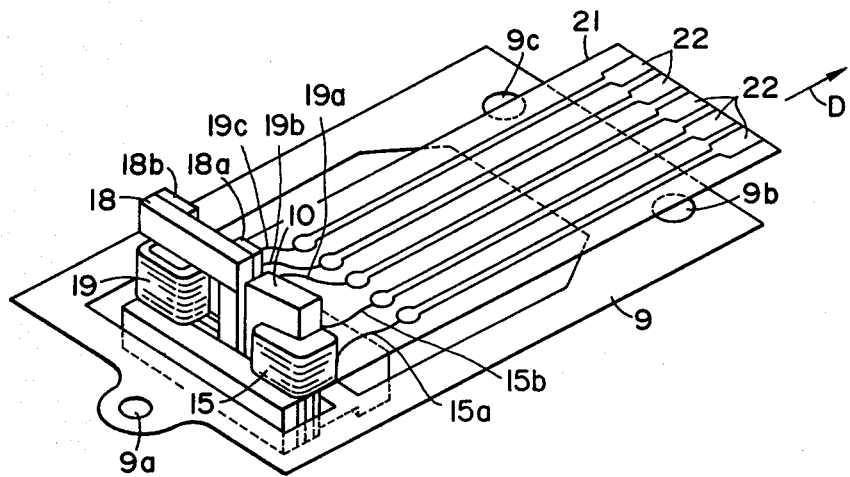
FIG. 5 is a perspective view of the magnetic head of the present invention.

FIG. 5 shows, in a perspective view the external view of the magnetic head of the present invention assembled from the components shown in FIG. 4, wherein the flexible printed circuit 21, if pulled in a direction of arrow D for any reason, is not peeled off from the elastic plate 9 since the circuit is sandwiched between the coils 15, 19 and the elastic plate 9. Moreover, the apertures 21a and 21b receive the core halve assemblies to further retain the printed circuit at its assembled location. Also even if one coil 15 or 19 has in sufficient insulation at the bottom face thereof, it will not be short-circuited by the elastic plate 9 because of the presence of highly insulating flexible printed circuit 21 between the coils 15, 19 and the conductive elastic plate 9.

As explained in the foregoing, the magnetic head of the present invention exhibits improved reliability because of the presence of a flexible printed circuit board between the coils and the elastic plate that provides insulation to minimize the chance of short-circuiting therebetween, and by securing the printing circuit board to the elastic plate with both sandwiched between embracing components of the magnetic head assembly.

What I claim is:

1. A magnetic head for at least one of recording information on and reading information from a recording medium, the information being processed by information processing means, said magnetic head comprising:
    support means formed with at least one aperture;
    connecting means, having electrical contact means thereon, supported on said support means and formed with at least one aperture; and
    at least one magnetic head element, connected by said electrical contact means on said connecting means to the information processing means, also supported on said support means and received in an aperture therein and in an aperture in said connecting means, portions of said magnetic head element holding therebetween said support means and said connecting means.

2. A magnetic head according to the claim 1, wherein said magnetic head elements comprise at least one magnetic core and a coil wound thereon, and said support means and said connecting means are held between a part of said magnetic core and said coil, which thereby comprise said portions of said magnetic head elements, at a location in the proximity of said apertures.

3. A magnetic head according to the claim 2, further comprising terminals for said coil, said terminals being connected to said connecting means at a portion thereof.

4. A magnetic head according to the claim 1, wherein said support means comprises an elastic member for elastically supporting said magnetic head elements, and said connecting means comprises a flexible member.

5. A magnetic head, comprising:
    a first member including a conductor and provided with at least one aperture;
    a second member including an electrical insulator provided with at least one aperture and at least one conductor formed on said insulator; and
    at least one magnetic head element including at least one magnetic core comprising a material of high magnetic permeability and received in said apertures in each of said first member and said second member; said magnetic head element further comprising a coil wound on said core at a position adjacent said electrical insulator of said second member.

6. A magnetic head according to the claim 5, wherein said coil includes terminals connected to said conductor of said second member.

* * * * *